(12) United States Patent
Parissi

(10) Patent No.: US 10,843,623 B2
(45) Date of Patent: Nov. 24, 2020

(54) SIGNAL DRONE FOR AN AUTOMOBILE

(71) Applicant: FORD GLOBAL TECHNOLOGIES, LLC, Dearborn, MI (US)

(72) Inventor: Jesus Marini Parissi, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 306 days.

(21) Appl. No.: 15/774,857

(22) PCT Filed: Nov. 12, 2015

(86) PCT No.: PCT/US2015/060279
§ 371 (c)(1),
(2) Date: May 9, 2018

(87) PCT Pub. No.: WO2017/082903
PCT Pub. Date: May 18, 2017

(65) Prior Publication Data
US 2018/0354417 A1  Dec. 13, 2018

(51) Int. Cl.
*B64C 39/02* (2006.01)
*B60Q 7/00* (2006.01)

(52) U.S. Cl.
CPC .............. *B60Q 7/00* (2013.01); *B64C 39/024* (2013.01); *B64C 2201/024* (2013.01);
(Continued)

(58) Field of Classification Search
CPC ............ B64C 39/024; B64C 2201/024; B64C 2201/027; B60Q 7/00; G05D 1/0094
See application file for complete search history.

(56) References Cited

U.S. PATENT DOCUMENTS 9,031,779 B2  5/2015  Djugash et al.
9,056,676 B1 *  6/2015  Wang ................... B64F 1/22
(Continued)

FOREIGN PATENT DOCUMENTS

CN  204415730 U  6/2015
DE  102011106170 A1  2/2012
(Continued)

OTHER PUBLICATIONS

KWID Concept : A New Vision Tailored for New Market Needs, Groupe Renault, http://media.renault.com/global/engb/renault/Media/PressRelease.aspx?mediaid=54505, Published Feb. 5, 2014, pp. 1-3.
(Continued)

*Primary Examiner* — Peter D Nolan
*Assistant Examiner* — Ce Li Li
(74) *Attorney, Agent, or Firm* — Gregory P. Brown; Brooks Kushman P.C.

(57) ABSTRACT

An emergency alert system for a vehicle includes a drone system including a warning sign disposed within a body defining cavity of the vehicle and a controller. The controller is configured to, in response to a user request during a stop, launch the drone system from the cavity and specify drone position relative to the vehicle based on traffic flow around the vehicle to alert other vehicles in a vicinity of the vehicle via the warning sign regarding occurrence of the stop.

15 Claims, 2 Drawing Sheets

(52) U.S. Cl.
CPC .... *B64C 2201/027* (2013.01); *B64C 2201/12* (2013.01); *B64C 2201/18* (2013.01); *B64C 2201/208* (2013.01)

(56) References Cited

U.S. PATENT DOCUMENTS

| | | |
|---|---|---|
| 2006/0169194 A1 | 8/2006 | Zumaquero |
| 2009/0314883 A1 | 12/2009 | Arlton et al. |
| 2012/0126700 A1* | 5/2012 | Mayfield ............... H05B 47/19 315/86 |
| 2015/0035437 A1 | 2/2015 | Panopoulos et al. |
| 2015/0158513 A1* | 6/2015 | Costa .................... B61L 23/041 348/144 |
| 2016/0272317 A1* | 9/2016 | Cho ....................... G08G 1/162 |

FOREIGN PATENT DOCUMENTS

| | | | |
|---|---|---|---|
| FR | 2986647 | A3 | 8/2013 |
| KR | 101452641 | B1 | 10/2014 |
| WO | 2014080388 | A2 | 5/2014 |

OTHER PUBLICATIONS

Aaron Souppouris, "Renault Concept Car Launches Drone to Check for Gridlock Ahead," The Verge, http://www.theverge.com/2014/2/7/5389114/renault-kwid-drone-car-concept, dated Feb. 7, 2014, pp. 1-2.
PCT Search Report for PCT/US2015/060279, dated Jan. 29, 2016, 7 pages.

* cited by examiner

SIGNAL DRONE FOR AN AUTOMOBILE

CROSS-REFERENCE TO RELATED APPLICATION

This application is the U.S. national phase of PCT Application No. PCT/US2015/060279 filed on Nov. 12, 2015, the disclosures of which is incorporated in its entirety by reference herein.

TECHNICAL FIELD

The present disclosure relates to roadside emergency signal systems.

BACKGROUND

Certain vehicles may be equipped with emergency roadside kits. These kits may include static signs that alert other drivers on the road during an emergency situation. For example, a vehicle may use a warning triangle placed on the ground next to the vehicle in order to alert other drivers that the vehicle is stopped. The static warning triangle must be positioned on the road by a driver. The driver may not be knowledgeable about roadside emergency procedures, such as the distance to place the roadside warning triangle such that other drivers will be able to notice the warning triangle. A lack of noticeability may render the static warning triangle ineffective to alert other vehicles sharing the road with a broken down vehicle.

SUMMARY

A vehicle includes a body that defines a cavity and a drone system disposed within the cavity that includes a warning sign. The vehicle also includes a controller configured to, in response to a user request during a stop, launch the drone system from the cavity and specify drone position relative to the vehicle based on traffic flow around the vehicle to alert other vehicles in a vicinity of the vehicle via the warning sign regarding occurrence of the stop.

An emergency alert system for a vehicle includes a drone system including a warning sign disposed within a body defining a cavity of the vehicle and a controller. The controller is configured to, in response to a user request during a stop, launch the drone system from the cavity and specify drone position relative to the vehicle based on traffic flow around the vehicle to alert other vehicles in a vicinity of the vehicle via the warning sign regarding occurrence of the stop.

A drone system for a vehicle includes a drone disposed within a storage compartment of the vehicle and having a warning sign attached with the drone and a drone controller. The drone controller is attached to the drone and configured to, in response to a user request during a vehicle stop, launch the drone from the storage compartment and specify a drone position relative to the vehicle based on traffic flow around the vehicle to alert other vehicles in a vicinity of the vehicle via the warning sign regarding occurrence of the vehicle stop.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A drone is typically a quad-copter remotely controlled aerial vehicle. Drones may be paired with land vehicles to communicate information to the vehicle. For example, a drone may be used to provide a three-dimensional ground profile to a navigational system for a vehicle. A drone may also be used to communicate to a land vehicle repair shop when a land vehicle is in need of repair. Drones may be used to communicate a variety of other information, such as when a vehicle is in distress or not able to move, to other vehicles on the road. For example, a drone may be used to communicate in an emergency situation more effectively than a roadside kit, such as a static emergency triangle.

Figure 1:
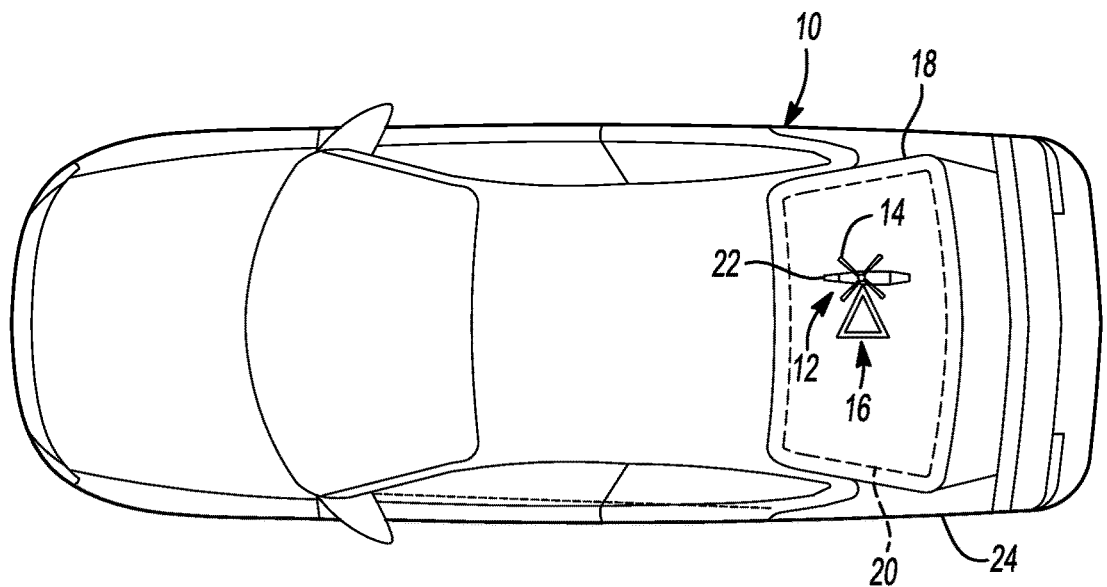
FIG. 1 is a top view of a vehicle having an emergency alert drone.

Referring to FIG. 1, a top view of a vehicle 10 is shown having a drone system 12 for use during a roadside emergency. The drone system 12 includes a drone 14 that has a warning sign 16 attached with the drone 14 stored within a body 18 defining a cavity 20 of the vehicle 10. The drone system 12 also includes a controller 22. The controller 22 may be integrated with the drone 14 or with the vehicle 10. Further, the warning sign 16 may be any warning sign 16 that may be used to alert other vehicles (not shown) to the presence of a disabled vehicle 10. The body 18 defining a cavity 20 may also be any storage compartment or available space within the vehicle 10. For example, FIG. 1 depicts the drone system 12 being located in a rear portion 24 of the vehicle 10. However, the drone system 12 may be stored anywhere within the vehicle 10.

As will be described in detail with reference to the other figures, the drone system 12 provides a better range of visualization than a static warning system. Utilizing a drone 14 to position the warning sign 16 provides a larger and more direct line of sight to other vehicles of an emergency situation. The drone system 12 further aids to inform other vehicles that the vehicle 10 is disabled and caution is advised while passing the vehicle 10. The drone system 12 may increase awareness while traveling and may aid to further prevent further collision with a disabled vehicle 10. Using a dynamic drone system 12 to provide an alert of an emergency situation increases noticeability of the emergency situation by increasing visualization and awareness.

Figure 2:
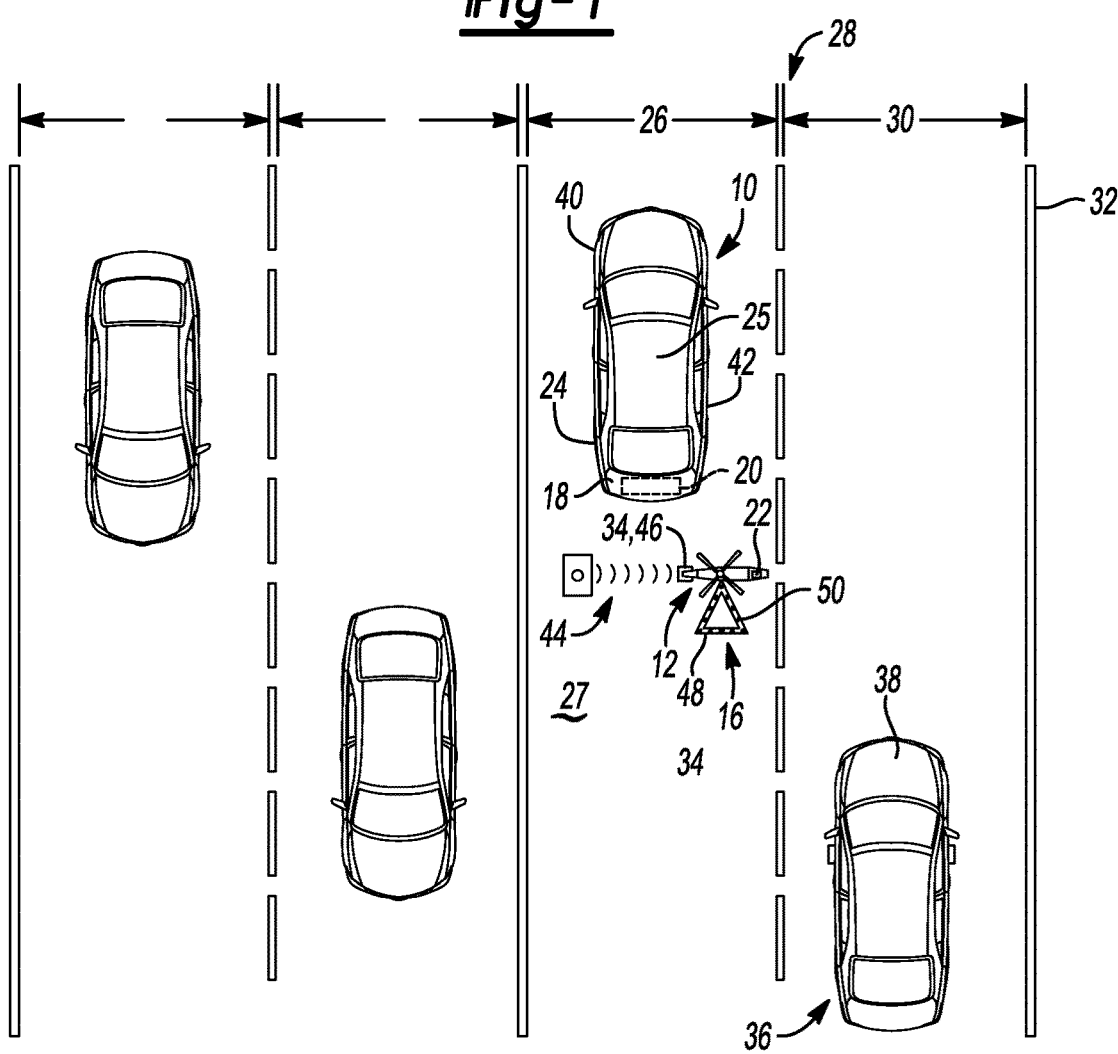
FIG. 2 is a top view of a vehicle on a roadside with a deployed emergency alert drone.

FIG. 2 depicts a top schematic view of a disabled vehicle 10 using the drone system 12 to alert an adjacent vehicle 38 of the emergency situation. FIG. 2 depicts the disabled vehicle 10 as being within a first lane 26 of a road 28. However, the drone system 12 may also be used when the disabled vehicle 10 is within a second lane 30 or while the disabled vehicle 10 is on a shoulder 32 of the road 28. As will be described with reference to FIG. 3, the drone system 12 may be configured to specify a position of the drone 14 and warning sign 16 depending on the location of the disabled vehicle 10. For example, the drone 14 may further include a plurality of sensors 34 to detect a traffic flow 36 around the vehicle 10 to specify a position of the drone 14 to increase visibility of the warning sign 16 to and adjacent vehicle 38. The adjacent vehicle 38 may be headed toward the rear portion 24 of the vehicle 10 or may be headed toward a front portion 40 of the vehicle 10. Likewise, the adjacent vehicle 38 may be headed toward the rear portion 24 of the vehicle 10 and adjacent a side 42 of the vehicle 10 or headed toward the front portion 40 of the vehicle 10 and adjacent the side 42 of the vehicle 10. The traffic flow may be bi-directional, in which adjacent vehicles 38 may be heading in two different directions, or uni-directional, in which adjacent vehicles 38 may be headed in a single direction. Also, the road 28 may have a single lane, or have at least two lanes.

When the vehicle 10 is disabled, an occupant (not shown) may launch the drone system 12. The controller 22 receives a signal indicative of a user request 44 to launch the drone system 12. For example, the occupant may send the user request 44 by actuating a button disposed either within a cabin (not shown) of the vehicle 10 or that is external to the vehicle 10, such as a key FOB. Likewise, the occupant may interact with a human machine interface to launch the drone system 12. The controller 22 opens the body 18 of the vehicle 10 and releases the drone system 12 from the cavity 20 of the body 18. The drone system 12 takes flight to indicate that the vehicle 10 is disabled.

The drone system 12 uses a plurality of sensors 34, such as a camera, ultrasonic sensor, and/or accelerometer attached to the drone 14 to map a position of the vehicle 10. The sensors 34 provide location data such as a position of the drone 14 relative to the vehicle 10 and the road 28 to locate the drone 14 relative to the vehicle 10 as well as the adjacent vehicle 38. For example, a camera 46 may be attached with the drone 14 and relate to the controller 22 the position of the vehicle 10 on the road 28, such as a top 25 of the vehicle 10 and a surface 27 of the road 28 as well as the traffic flow 36 around the vehicle 10, including positions of the adjacent vehicles 38. The controller 22 uses data from the camera 46 to increase visibility of the drone system 12. The controller 22 specifies a position of the drone system 12 using data from the camera 46 and compares to predetermined safety alert guidelines. For example, the controller 22 may receive data from the camera 46 indicating that the vehicle 10 is disabled within the first lane 26 of the road 28 and the traffic flow 36 around the vehicle 10 indicates that the adjacent vehicle 38 is headed toward the rear portion 24 of the vehicle 10. The controller 22 may then specify a position of the drone system 12 to be approximately 25 feet from the rear portion 24 of the vehicle 10 to increase visibility of the drone system 12 to the adjacent vehicle 38.

The controller 22 may activate the warning sign 16 attached with the drone 14 of the drone system 12. The warning sign 16 may include a warning triangle 48, the plurality of lights 50, or both. In at least one embodiment, the warning sign 16 includes both a reflective warning triangle 48 and a plurality of lights 50. Attaching the warning triangle 48 to the drone 14 increases visibility of the warning triangle 48 by automatically using the drone system 12 to position the warning triangle 48. The warning sign 16 may be formed as part of the drone 14, or may attach to the drone 14. Likewise, the plurality of lights 50 increases visibility by controlling the intensity of the plurality of lights 50. For example, the controller 22 may be configured to provide constant illumination of the plurality of lights 50 or allow for intermittent illumination of the plurality of lights 50. In at least one embodiment, the controller 22 may provide intermittent illumination of the plurality of lights 50 indicative of a distress signal using traditional Morse coding, such as but not limited to, an SOS. Use of universal distress signals by the controller 22 to indicate distress through the plurality of lights 50 increases awareness of a disabled vehicle 10 on the road 28. Constant illumination may be accomplished by the controller 22 my using a constant frequency of illumination of the lights 50.

Figure 3:
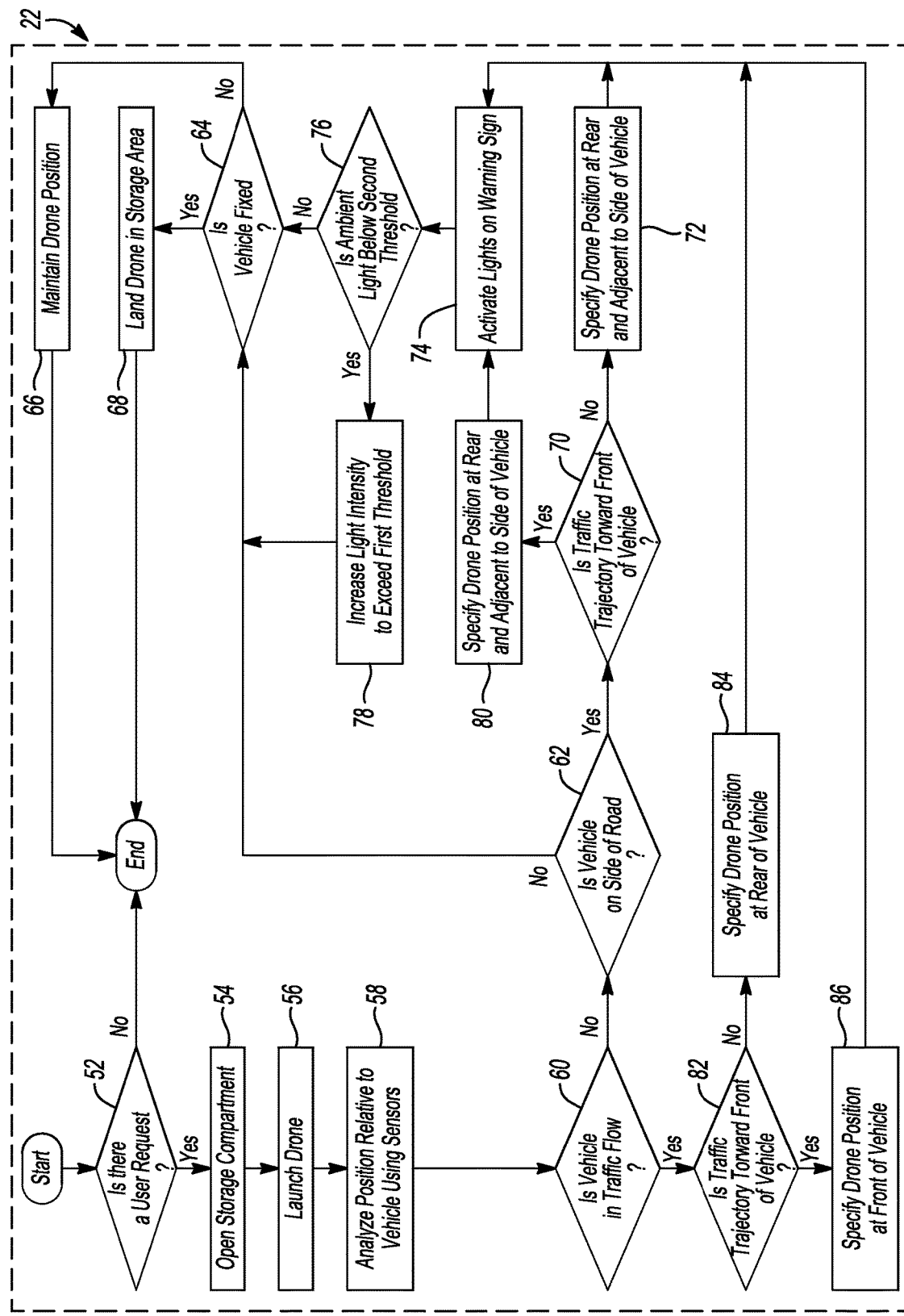
FIG. 3 is a control logic flow diagram for a controller to position the emergency alert drone.

FIG. 3 depicts control logic for the controller 22 to launch and specify drone system position. The controller 22 may be an in-vehicle controller, or a controller attached with the drone system to position the drone system. FIG. 3 depicts the control logic as sequential, however the control logic for the controller 22 may be implemented simultaneously or in conjunction with other aspects of the control logic to specify a position of the drone system to increase visibility of the warning sign and alert adjacent vehicles of the disabled vehicle. The control logic may be implemented on a single controller 22 or on multiple controllers 22 either in-vehicle, attached with the drone system, or both.

At 52, the controller 22 determines if a user request has been signaled. As stated above, the user request may be actuation of a human machine interface, or a depressible button. If at 52 no user request has been signaled, the control logic ends. If, however, at 52 a user request is present, the controller 22 opens the storage compartment containing the drone system at 54. Opening the storage compartment at 54 allows the controller 22 to launch the drone at 56. During launch at 56, the controller 22 analyzes the position of the drone system relative to the vehicle using the plurality of sensors as described above at 58. Analyzing the position of the drone system at 58 allows the controller 22 to adequately specify position of the drone system such that visibility and awareness of the warning sign increases. As the controller 22 receives and analyzes data from the sensors to specify the position of the drone system relative to the vehicle at 58, the controller 22 determines whether the vehicle is in traffic flow at 60.

If, at 60, the controller 22 determines that the vehicle is not in the traffic flow, the controller using the sensors from the drone system determines at 62 if the vehicle is on the shoulder, or side of the road. If, at 62, the controller 22 determines that the vehicle is not on a side of the road, the controller 22 determines at 64 if the vehicle is fixed, or has been repaired. If the controller 22, at 64, determines the vehicle has not been repaired, or fixed, the controller 22 instructs the drone system to maintain the drone position at 66. However, if at 64 the controller 22 determines the vehicle has been repaired, the controller 22 commands the drone to land within the storage compartment at 68 to return the drone system to the vehicle. The controller 22 may determine that the vehicle has been repaired at 64 either by receiving another user request, or by checking the vehicle systems to ensure proper operation.

Referring back to 62, if the controller 22 determines the vehicle is on a side of the road, the controller 22 uses the plurality of sensors on the drone system to determine if the trajectory of the traffic flow is headed toward the front of the vehicle at 70. If, at 70, the controller 22 determines that the traffic flow is not headed toward a front of the vehicle and is headed toward a rear of the vehicle, the controller 22 specifies the drone position to be at the rear end adjacent to the side of the vehicle at 72. Positioning the drone system to be at the rear and adjacent to the side of the vehicle at 72 allows the drone system to be visible to vehicles passing the disabled vehicle on the shoulder of the road. As stated above, by properly positioning the drone system based on the location of the disabled vehicle on the road, the controller 22 maximizes visibility and awareness of the disabled vehicle. At 74, the controller 22 activates the plurality of lights on the warning sign of the drone system. As described above, the controller 22 may allow the lights at 74 to maintain a constant illumination, or intermittent illumination.

The controller 22 also determines if the ambient lighting surrounding the drone system is below a second threshold at 76. Determining if ambient lighting surrounding the drone system is below a second threshold at 76 allows the controller 22 to determine if the vehicle has been disabled at night. This allows the drone system to be visible during a nighttime breakdown of the vehicle. If at 76, the controller 22 determines that the ambient lighting is below the second threshold, the controller 22 may increase the light intensity of the warning sign to exceed a first threshold at 78. Increasing the intensity of the lights on the warning sign at 78 further increases visibility of the drone system and allows the warning sign to be more visible to the traffic flow around the vehicle. If at 76, the controller 22 determines the ambient light is not below the second threshold or increases the intensity of light to exceed the first threshold at 78, the controller 22 will again determine if the vehicle has been repaired at 64 as described above and will follow the control logic described above. Referring back to 70, if the controller 22 determines the traffic flow trajectory is headed toward the front of the vehicle, the controller 22 will specify the drone position to be at the rear and adjacent to the side of the vehicle at 80. The controller 22 will activate the lights on the warning sign at 74 as described above and will also follow the control logic described above to land the drone at 68 or maintain the drone position at 66 ending the control logic.

Referring back to 60, if the controller 22 determines that the vehicle is in the traffic flow, the controller 22 determines if the traffic flow trajectory is headed toward a front of the vehicle at 82. If at 82, the controller 22 determines that the traffic flow trajectory is not headed toward a front of the vehicle but toward a rear of the vehicle, the controller 22 specifies the drone system position to be at a rear of the vehicle at 84. By placing the drone system at the rear of the vehicle at 84, the controller 22 increases the visibility of the warning sign when the vehicle is disabled in the middle of a lane. This allows the drone system, and as such the warning sign, at 84 to be visible at an appropriate distance to alert other vehicles that the vehicle is disabled and blockading a lane. The controller 22 will activate the lights on the warning sign at 74 as described above and will follow the control logic described above to land the drone at 68 or maintain the drone position at 66 ending the control logic.

If at 82, the controller 22 determines that the traffic flow trajectory is headed toward the front of the vehicle, the controller 22 specifies the drone system position to be at a front of the vehicle at 86. By placing the drone system at the front of the vehicle at 86, the controller 22 increases the visibility of the warning sign when the vehicle is disabled in the middle of a lane and opposing traffic may be headed for the front of the vehicle within that lane. This allows the drone system, and as such the warning sign, at 86 to be visible at an appropriate distance to alert other vehicles that the vehicle is disabled and blockading a lane in which opposing traffic may be traveling. The controller 22 will activate the lights on the warning sign at 74 as described above, and will also follow the control logic described above to land the drone at 68 or maintain the drone position at 66 ending the control logic.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a body defining a cavity;
   a drone system disposed within the cavity and including a warning sign; and
   a controller configured to, in response to a user request during a stop, launch the
   drone system from the cavity and specify drone position relative to the vehicle based on traffic flow
   around the vehicle to alert other vehicles in a vicinity of the vehicle via the warning sign regarding
   occurrence of the stop, wherein
     the drone position is relative to a front of the vehicle responsive to the traffic flow around the vehicle being bi-directional on a road having at least two lanes and other vehicles are headed toward the front of the vehicle on a trajectory to intersect the vehicle,
     the drone position is relative to a rear of the vehicle responsive to the traffic flow around the vehicle being bi-directional on a road having at least two lanes and other vehicles are headed toward the rear of the vehicle on a trajectory to intersect the vehicle,
     the drone position is relative to a front and adjacent a side of the vehicle responsive to the traffic flow around the vehicle being uni-directional on a road having at least one lane and other vehicles are headed toward the front of the vehicle on a trajectory adjacent the side of the vehicle, and
     the drone position is relative to a rear and adjacent a side of the vehicle responsive to the traffic flow around the vehicle being uni-directional on a road having at least one lane and other vehicles are headed toward the rear of the vehicle on a trajectory adjacent the side the vehicle.

2. The vehicle of claim 1, wherein the drone position is relative to a front of the vehicle responsive to the traffic flow around the vehicle being uni-directional on a road having at least one lane and other vehicles are headed toward the front of the vehicle on a trajectory to intersect the vehicle.

3. The vehicle of claim 1, wherein the drone position is relative to a rear of the vehicle responsive to the traffic flow around the vehicle being uni-directional on a road having at least one lane and other vehicles are headed toward the rear of the vehicle on a trajectory to intersect the vehicle.

4. The vehicle of claim 1, wherein the drone position is relative to a front and adjacent a side of the vehicle responsive to the traffic flow around the vehicle being bi-directional on a road having at least two lanes and other vehicles are headed toward the front of the vehicle on a trajectory adjacent the side of the vehicle.

5. The vehicle of claim 1, wherein the drone position is relative to a rear and adjacent a side of the vehicle responsive to the traffic flow around the vehicle being bi-directional on a road having at least two lanes and other vehicles are headed toward the rear of the vehicle on a trajectory adjacent the side of the vehicle.

6. An emergency alert system for a vehicle comprising:
a drone system including a warning sign disposed within a body defining cavity of the vehicle; and
a controller configured to, in response to a user request during a stop, launch the drone system from the cavity and specify drone position relative to the vehicle based on traffic flow around the vehicle to alert other vehicles in a vicinity of the vehicle via the warning sign regarding occurrence of the stop, wherein
the drone position is relative to a front of the vehicle responsive to the traffic flow around the vehicle being bi-directional on a road having at least two lanes and other vehicles are headed toward the front of the vehicle on a trajectory to intersect the vehicle,
the drone position is relative to a rear of the vehicle responsive to the traffic flow around the vehicle being bi-directional on a road having at least two lanes and other vehicles are headed toward the rear of the vehicle on a trajectory to intersect the vehicle,
the drone position is relative to a front and adjacent a side of the vehicle responsive to the traffic flow around the vehicle being uni-directional on a road having at least one lane and other vehicles are headed toward the front of the vehicle on a trajectory adjacent the side of the vehicle, and
the drone position is relative to a front and adjacent a side of the vehicle responsive to the traffic flow around the vehicle being uni-directional on a road having at least one lane and other vehicles are headed toward the front of the vehicle on a trajectory adjacent the side of the vehicle.

7. The emergency alert system of claim 6, wherein the drone position is relative to a rear of the vehicle responsive to the traffic flow around the vehicle being bi-directional on a road having at least two lanes and other vehicles are headed toward the rear of the vehicle on a trajectory to intersect the vehicle.

8. The emergency alert system of claim 6, wherein the drone position is relative to a rear and adjacent a side of the vehicle responsive to the traffic flow around the vehicle being bi-directional on a road having at least two lanes and other vehicles are headed toward the rear of the vehicle on a trajectory adjacent the side of the vehicle.

9. The emergency alert system of claim 6, wherein the drone system further includes a plurality of lights attached to the warning sign configured to illuminate at a frequency indicative of a distress signal.

10. The emergency alert system of claim 9, wherein the controller is further configured to increase an intensity of the plurality of lights so as to exceed a first threshold when ambient light is less than a second threshold.

11. A drone system for a vehicle comprising:
a drone disposed within a storage compartment of the vehicle and having a warning sign attached with the drone; and
a drone controller attached to the drone and configured to, in response to a user request during a vehicle stop, launch the drone from the storage compartment and specify a drone position relative to the vehicle based on traffic flow around the vehicle to alert other vehicles in a vicinity of the vehicle via the warning sign regarding occurrence of the vehicle stop, wherein
the drone position is relative to a front of the vehicle responsive to the traffic flow around the vehicle being bi-directional on a road having at least two lanes and other vehicles are headed toward the front of the vehicle on a trajectory to intersect the vehicle, and
the drone position is relative to a front and adjacent a side of the vehicle responsive to the traffic flow around the vehicle being uni-directional on a road having at least one lane and other vehicles are headed toward the front of the vehicle on a trajectory adjacent the side of the vehicle.

12. The drone system of claim 11, wherein the drone controller is configured to specify a drone position using a plurality of sensors attached to the drone configured to manipulate drone flight.

13. The drone system of claim 11 further comprising a plurality of lights attached to the warning sign configured to illuminate at a constant frequency.

14. The drone system of claim 13, wherein the drone controller is further configured to increase light intensity to exceed a first threshold when ambient light is less than a second threshold.

15. The drone system of claim 11 further comprising a plurality of lights attached to the warning sign configured to illuminate at frequency indicative of a distress signal.

* * * * *